Jan. 4, 1938.   A. M. DAVIES   2,104,415
PROCESS FOR THE PRESERVATION OF FRUIT JUICES
Filed Dec. 31, 1934

INVENTOR.
AUSTIN MORRIS DAVIES
BY
Clark & Ott
ATTORNEYS.

Patented Jan. 4, 1938

2,104,415

UNITED STATES PATENT OFFICE 2,104,415

PROCESS FOR THE PRESERVATION OF FRUIT JUICES

Austin Morris Davies, Jamaica, N. Y.

Application December 31, 1934, Serial No. 759,895

2 Claims. (Cl. 99—155)

This invention relates to the art of treating fruit juices and the like to preserve the same and refers more particularly to a process of treating fruit juice having evanescent flavors, such as the juices of citrus fruits, pineapples and the like.

Heretofore, juices such as orange juice, grapefruit juice and pineapple juice have been sterilized to preserve the same and then hot packed in sealed containers, or the juices have been frozen and then delivered in such frozen condition or in a freshly melted condition. The heating of the juice to sterilize the same in the hot packaging method, has been found to impair the vitamin content and the flavor of the juice and the freezing method has been found to prevent the juice being maintained in a liquid condition for any appreciable time, in view of the fact that rapid deterioration takes place, when the temperature of the juice is elevated above its freezing point, through the action of oxidation which destroys the essential vitamin content, in addition to altering the color to an unnatural dark appearance. The freezing method also prevents blending of the products of different seasons or of different shipments which arrive at the factory or plant on different days.

These methods, therefore, have been only partially successful since they have failed to preserve the vitamin content of the juice and to retain the flavors and the color of the juices and therefore, in order to overcome the above noted objections and disadvantages, the present invention comprehends a process of treating fruit juices so that they may be packaged in liquid form while preserving the original vitamin content, color and the essential evanescent oils which in their natural combination constitute the flavor of the fruit juices.

With the foregoing ends in view the invention contemplates a process of the indicated character which includes the elimination of the free oxygen in the juices by the washing action of an inert gas and the pasteurization of the juices either simultaneously with the deoxygenation thereof or separately therefrom.

The invention more particularly includes the deoxygenation of the free oxygen in the juices by an inert gas, such as nitrogen, carbon dioxide or other non-oxidizing gas which does not chemically react injuriously with the juices and which gas is chilled so as to condense and effect the return to the juices of the water vapor and volatile oils taken up by the gas.

The process further includes a recycling and cooling of the gas so that the gas absorbs the free oxygen content thereof and such of the water vapors and volatile oils which are absorbed by the gas are condensed and returned to the juices. The recycling of the gas may be effected by a counter-flow of the gas and juices from one container to another, the temperature within one of which is relatively higher than the other so as to pasteurize the juices and thereby destroy mold, yeast and bacteria present in the juices, while the passage of the gas through the cooler container will cause condensation of the water vapor and volatile oils, absorbed by the gas in the relatively higher container and the return of the condensate to the juice in the cooler container and whereby the chilled gas will absorb the maximum amount of oxygen in its passage through the cooler container.

With the above enumerated and other objects in view, reference is now made to the following specification and accompanying drawing in which there has been disclosed by way of example apparatus by which the process may be carried out, while the claims cover variations and modifications of the invention which fall within their scope.

Figure 1:
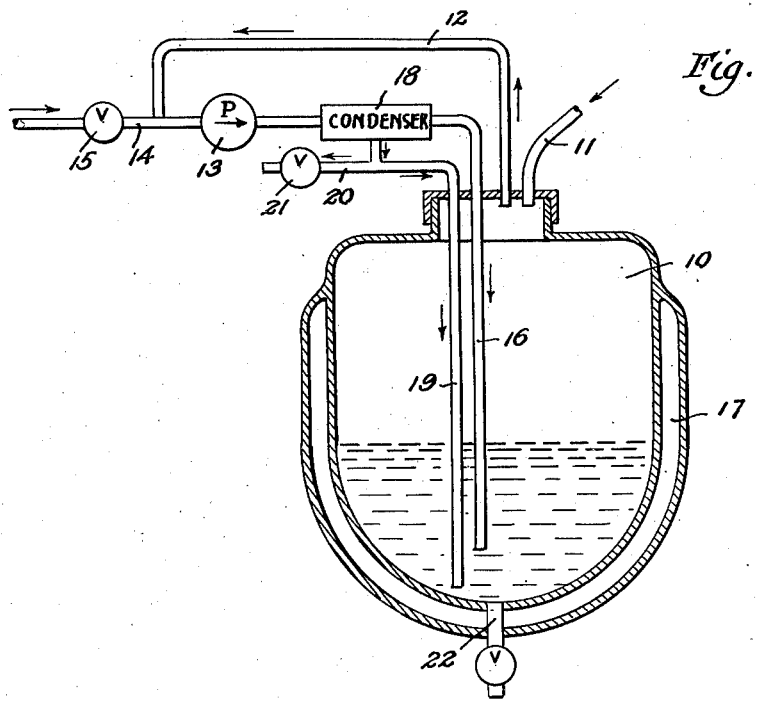
Fig. 1 is a diagrammatic view of a single stage recycling apparatus for carrying out the process.

Referring, by characters of reference, to the apparatus illustrated in Fig. 1 of the drawing, 10 designates a closed container which may be of any preferred form or character and in which, in the performance of the process, a batch of the fresh juice is deoxygenated and pasteurized to thereby rid the juice of its free oxygen content and to destroy the mold, yeast and bacteria present therein in order to prevent oxidation of the juice and the growth of mold. The fresh juice is admitted to the container 10 through a charging pipe 11 which is then sealed so as to maintain the juice in an air-tight condition which renders the circulating gas more effective to deoxygenize the juice and also prevent the escape of the vapors and volatile oils therefrom. Leading from the top of the container 10 is a gas recirculating pipe 12 which connects with the intake or suction orifice of a fluid pump 13, the intake or suction orifice thereof also having connected thereto a feed pipe 14 controlled by a pressure valve 15 and through which an inert gas, such as nitrogen, carbon dioxide or other non-oxidizing gas is admitted and forced by the pump into the container through the pipe 16 which has its outlet end immersed in the juice through which the gas bubbles and absorbs the free oxygen therein. The juice is heated to a temperature of from 70° F. to 150° F., depending upon the character and type of juice being treated either prior to being admitted to the container or the container is provided with a heating jacket 17 or any other equivalent means to heat the juice within the container to the desired temperature during the deoxygenation process. In either heating method, the volatile oils and the water content of the juice are vaporized so as to fill the upper part of the container and the circulating gas passing through the vapors absorbs more of the free oxygen and picks up some of the water vapor and volatile oils which are then conveyed by the gas through the re-circulating pipe 12 due to the suction of the pump 13.

As the gas is more efficient in absorbing free oxygen at lower temperatures than at the temperature of pasteurization, a condenser 18 is provided in the pipe 16 between the pump and the container 10 so as to not only lower the temperature of the circulating gas but condense the water vapor and volatile oils taken up by the gas, which condensate is by-passed and returned to the container through a pipe 19 which has its lower end immersed in the juice to provide a seal and prevent counter-flow of the vapors. The pipe 19 is provided with a vent 20 having a bleed valve 21 through which oxygen laden gas is exhausted to the atmosphere in the event that excessive pressure is built up by the pump.

It will be understood from the foregoing that the process of ridding the juice of its free oxygen content and pasteurizing the same so as to destroy the germs and bacteria present therein, is continuous due to the re-cycling of the gas, fresh gas being taken in through the feed pipe 14 whenever the pressure in the pipe 12 falls below the set pressure of the valve 15, while the water vapor and volatile oils taken up by the gas are condensed during their passage through the condenser 18 and thence returned to the juice so that the original flavor of the juice is maintained.

In treating orange juice, by the use of the above described apparatus, a temperature of from 125° F. to 150° F. has been found satisfactory to effect pasteurization, at which temperatures the gas does not react injuriously with the vitamin content of the juice, nor is the color or flavor of the juice affected. By ridding the juice of its free oxygen content, oxidation within the juice is prevented. It has also been found that when the juice contains free oxygen, oxidation takes place after a short period of time, which attacks the vitamin content, thereby impairing the character and quality of the juice.

The accumulation of oxygen in the gas necessitates an occasional bleeding of some of the gas to the atmosphere and replenishing the deficiency with fresh gas which may be accomplished by manipulating either one or both of the valves 15 and 21.

After the juices have been treated they are withdrawn from the container 10 through the outlet pipe 22.

Figure 2:
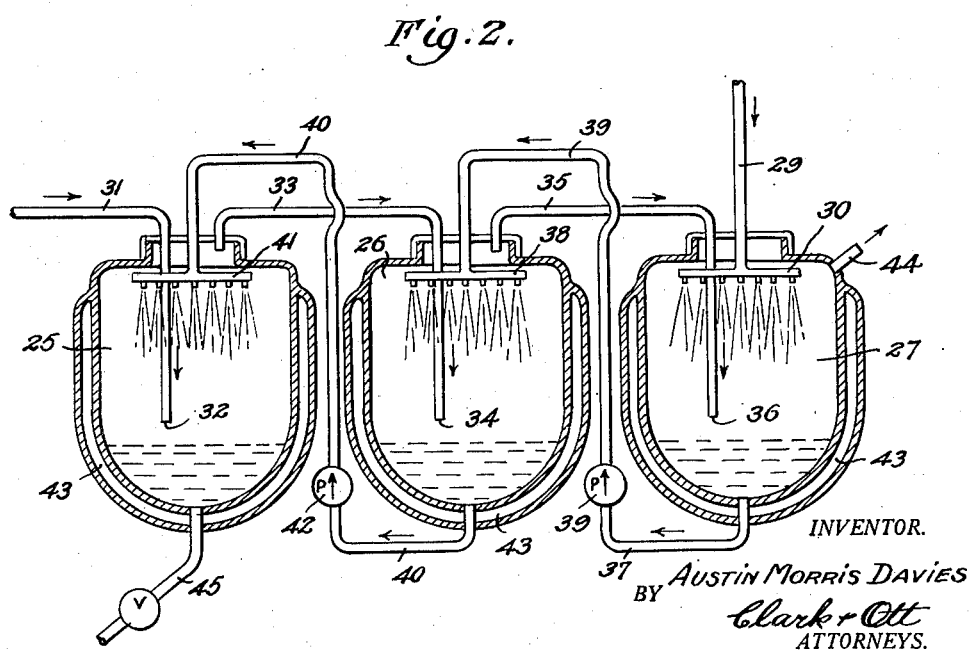
Fig. 2 is a diagrammatic view of a multiple stage counter-flow apparatus for carrying out the process.

The recycling of the gas may also be accomplished by a counter-flow of the gas and juice as shown in the apparatus illustrated in Fig. 2 of the drawing. In this apparatus a plurality of containers are employed, three being shown in the present instance and designated by the reference characters 25, 26, and 27. The gas is supplied to the container 25 by a feed pipe 31 which extends downwardly therein with its outlet end 32 located adjacent the bottom of the container. Communication is established between the containers 25 and 26 for circulating the gas, by a conduit pipe 33 which leads from the top of the container 25 and extends downwardly into the container 26 with its outlet end 34 disposed adjacent the bottom of said container. Communication is also established between the containers 26 and 27, for circulating the gas, by a conduit pipe 35 which leads from the top of the container 26, and which extends downwardly into the container 27 with its outlet end 36 located adjacent the bottom of said container 27.

In order to provide means for effecting a counter-flow of the juice through the containers with reference to the direction of the flow of the gas, the fresh juice is supplied to the container 27 by a charging pipe 29 having an outlet end provided with a spray head 30 for delivering the juice to the container in the form of a spray. A conduit pipe 37 leads from the bottom of the container 27 to the top of the container 26, the outlet end of said conduit being provided with a spray head 38 for delivering the juice in the form of a spray to the container 26, a fluid pump 39 being provided in the conduit pipe 37 for feeding the juice from the container 27 to the container 26. A similar conduit pipe 40 leads from the bottom of the container 26 to the upper portion of the container 25 and said conduit pipe is provided at its outlet end with a spray head 41. A pump 42 is provided in the conduit pipe 40 for feeding the juice from the container 26 to the container 25. In this instance, the containers are heated by any suitable means, such as by heating jackets 43, by virtue of which the container 25 is heated to the temperature of pasteurization, while the containers 26 and 27 may be heated to progressively lower temperatures.

In employing the apparatus, as shown in Fig. 2, to carry out the process, the fresh juice is admitted to the container 27 at atmospheric temperature and is successively conveyed from the spray heads 30, 38, and 41 into the containers 27, 26, and 25 respectively, while the gas is fed to the container 25 and successively passes from the container 25 to the container 26 and thence from the container 26 to the container 27. As the gas passes through the container 25 it absorbs oxygen from the sprayed heated juice and picks up water vapors and volatile oils which are conveyed by means of the conduit pipe 33 to the container 26 which, being at a lower temperature than the container 25, causes some of the water vapor and volatile oils to be condensed and deposited in the container 26, while the gas continues to absorb free oxygen from the juice being sprayed into the container 26. The gas with its oxygen content, and with the water vapor and volatile oils picked up in the container 26, is then conveyed by the conduit pipe 35 to the container 27. The container 27 being at a relatively lower temperature than the container 26, lowers the temperature of the incoming gas and effects a further condensation of the water vapor and volatile oils carried over by the gas which are deposited in the container 27, the gas also absorbing sufficient free oxygen from the fresh juice to substantially saturate the same which is then discharged from the container 27 through a vent pipe 44.

From the foregoing it will thus be seen that by the time the juice has passed though the several containers and drawn off from the container 25 through the discharge pipe 45, the juice will be substantially devoid of its residual or free oxygen. The juice is continuously fed through the apparatus in one direction, while the gas is continuously fed through the apparatus in the opposite direction, thus subjecting the juice to the action of a counter-flowing gas, while the completely treated juice is continuously drawn off and the oxygenated gas expelled.

It is, of course, obvious that any one or all of the containers illustrated in Fig. 2 of the drawing may, if desired, be provided with means for re-cycling the juice and gas, as illustrated in Fig. 1 of the drawing, so that the treatment of the juice is augmented at each stage.

The treated juice, as it is drawn from the apparatus, is packed in containers from which the air has been exhausted and replaced by nitrogen, carbon-dioxide or any equivalent inert gas, in which atmosphere the juice is maintained in a sealed condition.

What is claimed is:

1. A process of treating fresh fruit juice to pasteurize the same and remove the free oxygen therefrom, consisting in passing the juice to be treated successively through a series of chambers of progressively increasing temperatures, passing an inert gas successively through the juice in said chambers in a direction opposite to the direction of flow of the juice therethrough to remove from the juice the free oxygen content, to pasteurize the juice and to effect the recovery and the return of the vapors taken up by the gas.

2. A process of treating fresh fruit juices, consisting in passing the fruit juice through a series of heated chambers of progressively increasing temperatures, in which the final chamber is maintained at a temperature to pasteurize the juice, by introducing the juice into each chamber in the form of a spray and passing an inert gas successively through the juice spray in a direction opposed to the flow of the juice, the inert gas being admitted into the final chamber and being heated therein to substantially the temperature of pasteurization of the juice by contact therewith, absorbs the free oxygen content of the juice and takes up the volatile constituents thereof, the gas then being successively introduced into the remaining chambers in which its temperature is progressively lowered by contact with the cooler incoming juice spray which causes the vapors in the gas to be condensed and deposited with the incoming juice while the inert gas continues to successively absorb more of the free oxygen content of the incoming cooler juice by co-mingling therewith in a direction contrary to the flow of the juice spray, the inert gas then being withdrawn from the first juice receiving chamber.

AUSTIN MORRIS DAVIES.